U S009790832B2

(12) United States Patent
Mitsuda

(10) Patent No.: US 9,790,832 B2
(45) Date of Patent: Oct. 17, 2017

(54) EXHAUST GAS PURIFICATION DEVICE

(71) Applicant: YANMAR CO., LTD., Osaka (JP)

(72) Inventor: Masataka Mitsuda, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 94 days.

(21) Appl. No.: 14/655,382

(22) PCT Filed: Dec. 19, 2013

(86) PCT No.: PCT/JP2013/084140
§ 371 (c)(1),
(2) Date: Jun. 25, 2015

(87) PCT Pub. No.: WO2014/103890
PCT Pub. Date: Jul. 3, 2014

(65) Prior Publication Data
US 2016/0215671 A1   Jul. 28, 2016

(30) Foreign Application Priority Data

Dec. 26, 2012  (JP) ................................ 2012-283485

(51) Int. Cl.
*B01D 50/00*  (2006.01)
*F01N 3/28*   (2006.01)
(Continued)

(52) U.S. Cl.
CPC ....... *F01N 3/2885* (2013.01); *B01D 46/0012* (2013.01); *B01D 46/0027* (2013.01);
(Continued)

(58) Field of Classification Search
CPC .. F01N 3/2885; F01N 13/008; F01N 2450/22; F01N 2590/08; F01N 13/0097; F01N 2260/18
(Continued)

(56) References Cited

U.S. PATENT DOCUMENTS 4,426,844 A * 1/1984 Nakano ................... F01N 3/043
165/73
2009/0272106 A1* 11/2009 Werni ................... F01N 3/0335
60/297
(Continued)

FOREIGN PATENT DOCUMENTS

CN  102159809 A   8/2011
CN  102630269 A   8/2012
(Continued)

*Primary Examiner* — Tom P Duong
(74) *Attorney, Agent, or Firm* — Norris McLaughlin & Marcus P.A.

(57) ABSTRACT

An exhaust gas purification device having such a structure that exhaust gas can uniformly flow into without depending on a shape of an exhaust gas inlet pipe. A gas purification body which purifies the exhaust gas, a purification casing which accommodates the gas purification body, an exhaust gas inlet pipe which communicates with an exhaust gas inflow port of the purification casing, and an exhaust gas outlet pipe which communicates with an exhaust gas outflow port of the purification casing. The exhaust gas inlet pipe is attached to the purification casing in such a manner as to cover the exhaust gas inflow port and extend in a longitudinal direction of the purification casing. An introduction passage of the exhaust gas is formed by an outside surface of the purification casing and an inside surface of a pipe wall of the exhaust gas inlet pipe. A portion extending along the purification casing in the pipe wall is inclined so as to come close to the outside surface of the purification casing in proportion to heading for an exhaust gas outlet side from an exhaust gas inlet side.

4 Claims, 12 Drawing Sheets

(51) Int. Cl.
    *F01N 13/00*     (2010.01)
    *F01N 13/18*     (2010.01)
    *B01D 46/00*     (2006.01)
    *B01D 53/94*     (2006.01)
    *F01N 3/035*     (2006.01)

(52) U.S. Cl.
    CPC ........... *B01D 53/944* (2013.01); *F01N 3/035* (2013.01); *F01N 13/008* (2013.01); *F01N 13/0097* (2014.06); *F01N 13/1855* (2013.01); *F01N 13/1872* (2013.01); *F01N 2260/08* (2013.01); *F01N 2260/18* (2013.01); *F01N 2340/02* (2013.01); *F01N 2450/22* (2013.01); *F01N 2470/18* (2013.01); *F01N 2590/08* (2013.01)

(58) Field of Classification Search
    USPC .................................................. 422/177, 180
    See application file for complete search history.

(56) References Cited

U.S. PATENT DOCUMENTS

| | | |
|---|---|---|
| 2011/0023471 A1 | 2/2011 | Werni et al. |
| 2011/0154809 A1 | 6/2011 | Mitsuda et al. |
| 2011/0167807 A1 | 7/2011 | Mitsuda |
| 2011/0192671 A1 | 8/2011 | Mitsuda et al. |
| 2011/0214416 A1 | 9/2011 | Kowada et al. |

FOREIGN PATENT DOCUMENTS

| | | |
|---|---|---|
| EP | 2261475 A1 | 12/2010 |
| EP | 2333259 A1 | 6/2011 |
| EP | 2341227 A1 | 7/2011 |
| JP | 2004-263593 | 9/2004 |
| JP | 2005-194949 | 7/2005 |
| JP | 2009-068415 | 4/2009 |
| JP | 2011-117328 | 6/2011 |
| WO | WO-2010/032646 | 3/2010 |
| WO | WO-2010-101018 | 9/2010 |
| WO | WO-2011/118527 | 9/2011 |

\* cited by examiner

EXHAUST GAS PURIFICATION DEVICE

TECHNICAL FIELD

The present invention relates to an exhaust gas purification device which is mounted to a diesel engine, and more particularly to an exhaust gas purification device which removes particulate matter (soot and particulate) and the like contained in exhaust gas.

BACKGROUND OF THE INVENTION

Heretofore, there has been known a technique which is provided with a diesel particulate filter (hereinafter, refer to as DPF) as an exhaust gas purification device in an exhaust gas channel of a diesel engine (hereinafter, refer to as an engine), and purifies exhaust gas from the diesel engine by the DPF (refer, for example, to Patent Document 1). In the DPF, there has been also known a technique in which an inside case is provided in an inner portion of an outside case so as to form a double structure, and an oxidation catalyst or a soot filter is embedded in the inside case (refer, for example, to Patent Document 2).

CITATION LIST

Patent Documents

Patent Document 1: Japanese Unexamined Patent Publication No. 2004-263593

Patent Document 2: Japanese Unexamined Patent Publication No. 2005-194949

In the meantime, the engine has a wide general versatility, and is used in various field such as a construction machine and an agricultural machine. A mounting space of the engine is variously changed according to the machine to be mounted, however, it is often the case that the mounting space is restricted (narrow) in recent years at the request of weight saving and compact structure. Further, in the DPF, it is considered that the high temperature (for example, 300° C. or higher) of the exhaust gas passing through the DPF is desirable functionally. As a result, there is a request that the DPF should be attached to the engine.

In the case that the DPF is attached to the engine, it is necessary to make an exhaust pipe line connecting from the exhaust manifold to the DPF longer or curved according to an attaching position of the DPF. However, the longer the exhaust pipe line is, the more the temperature of the exhaust gas is lowered until reaching the DPF, so that reduction of an exhaust gas purification performance of the DPF is caused. Further, since the exhaust gas flows while coming into collision with a curved inner surface of the exhaust pipe line as long as the exhaust pipe line is curved, a flow speed of the exhaust gas is of course slow. Since the reduction of the flow speed necessarily induces reduction of the temperature of the exhaust gas, the reduction of the exhaust gas purification performance of the DPF is caused also in this case.

The present invention is made after making a study of these actual conditions, and a technical object of the present invention is to provide a DPF having such a structure that exhaust gas can uniformly flow into without depending on a shape of an exhaust pipe line.

SUMMARY OF THE INVENTION

The invention according to a first aspect is an exhaust gas purification device comprising:

a gas purification body which purifies exhaust gas discharged from an engine;

a purification casing which accommodates the gas purification body;

an exhaust gas inlet pipe which communicates with an exhaust gas inflow port of the purification casing;

an exhaust gas outlet pipe which communicates with an exhaust gas outflow port of the purification casing;

the exhaust gas inlet pipe being attached to the purification casing in such a manner as to cover the exhaust gas inflow port and extend in a longitudinal direction of the purification casing; and an introduction passage of the exhaust gas being formed by an outside surface of the purification casing and an inside surface of a pipe wall of the exhaust gas inlet pipe, wherein a portion extending along the purification casing in the pipe wall of the exhaust gas inlet pipe is inclined so as to come close to the outside surface of the purification casing gradually toward an exhaust gas outlet side from an exhaust gas inlet side of the exhaust gas inlet pipe.

The invention according to a second aspect is the exhaust gas purification device described in the first aspect, wherein a concave surface portion concaved outward is formed in an inner surface side of a side end surface close to the exhaust gas inflow port in the purification casing.

The invention according to a third aspect is the exhaust gas purification device described in the first or second aspect, wherein a portion close to the exhaust gas outflow port in the pipe wall of the exhaust gas inlet pipe is inclined so as to move away from a center line of the exhaust gas inlet side gradually toward the exhaust gas outlet side from the exhaust gas inlet side of the exhaust gas inlet pipe.

According to the invention of the first aspect, in the exhaust gas purification device comprising the gas purification body which purifies the exhaust gas discharged from the engine, the purification casing which accommodates the gas purification body, the exhaust gas inlet pipe which communicates with the exhaust gas inflow port of the purification casing, and the exhaust gas outlet pipe which communicates with the exhaust gas outflow port of the purification casing, and structured such that the exhaust gas inlet pipe is attached to the purification casing in such a manner as to cover the exhaust gas inflow port and extend in the longitudinal direction of the purification casing, and that the introduction passage of the exhaust gas is formed by the outside surface of the purification casing and the inside surface of the pipe wall of the exhaust gas inlet pipe, the portion extending along the purification casing in the pipe wall of the exhaust gas inlet pipe is inclined so as to come close to the outside surface of the purification casing gradually toward the exhaust gas outlet side from the exhaust gas inlet side of the exhaust gas inlet pipe. As a result, it is possible to heat up the purification casing by the exhaust gas within the exhaust gas inlet pipe (within the introduction passage), and it is possible to suppress the reduction of the temperature of the exhaust gas which passes through the inner side of the purification casing. Therefore, it is possible to improve the exhaust gas purification performance of the exhaust gas purification device. The inclined shape of the portion extending along the purification casing in the pipe wall can be formed into a guide surface which feeds the exhaust gas to the exhaust gas inflow port. The exhaust gas inlet pipe can be utilized as a reinforcing member of the purification casing, and it is possible to smoothly guide the exhaust gas from the engine into the purification casing by the inclined shape of the portion extending along the purification casing in the pipe wall in spite of the fact that a rigidity improvement of the purification casing can be achieved by a simple structure without thickening the purification casing or extremely increasing the parts number. The exhaust gas can be supplied to a wide area of the gas purification body within the purification casing, thereby contributing to efficient utilization of the gas purification body.

According to the invention of the second aspect, the concave surface portion concaved outward is formed in the inner surface side of the side end surface close to the exhaust gas inflow port in the purification casing. As a result, the exhaust gas can be supplied from the exhaust gas inflow port of the purification casing toward the concave surface portion, and a swirl flow and a turbulent flow can be easily formed in the exhaust gas upstream side of the gas purification body on the basis of an exhaust gas diffusing action generated by the concave surface portion. Therefore, it is possible to supply the exhaust gas to an end surface in the exhaust gas upstream side of the gas purification body as uniformly as possible.

According to the invention of the third aspect, the portion close to the exhaust gas outflow port in the pipe wall of the exhaust gas inlet pipe is inclined so as to move away from the center line of the exhaust gas inlet side gradually toward the exhaust gas outlet side from the exhaust gas inlet side of the exhaust gas inlet pipe. As a result, the exhaust gas comes into collision with the outside surface of the purification casing in the portion close to the exhaust gas outflow port in the pipe wall inside surface of the exhaust gas inlet pipe, however, a cubic capacity of the portion is secured. Therefore, the formation of the swirl flow and the turbulent flow can be carried out even in the side closer to the exhaust gas upstream than the exhaust gas inflow port. The exhaust gas can be uniformly supplied to the end surface in the exhaust gas upstream side of the gas purification body more securely.

DETAILED DESCRIPTION OF THE PREFERRED EMBODIMENTS

Figure 1:
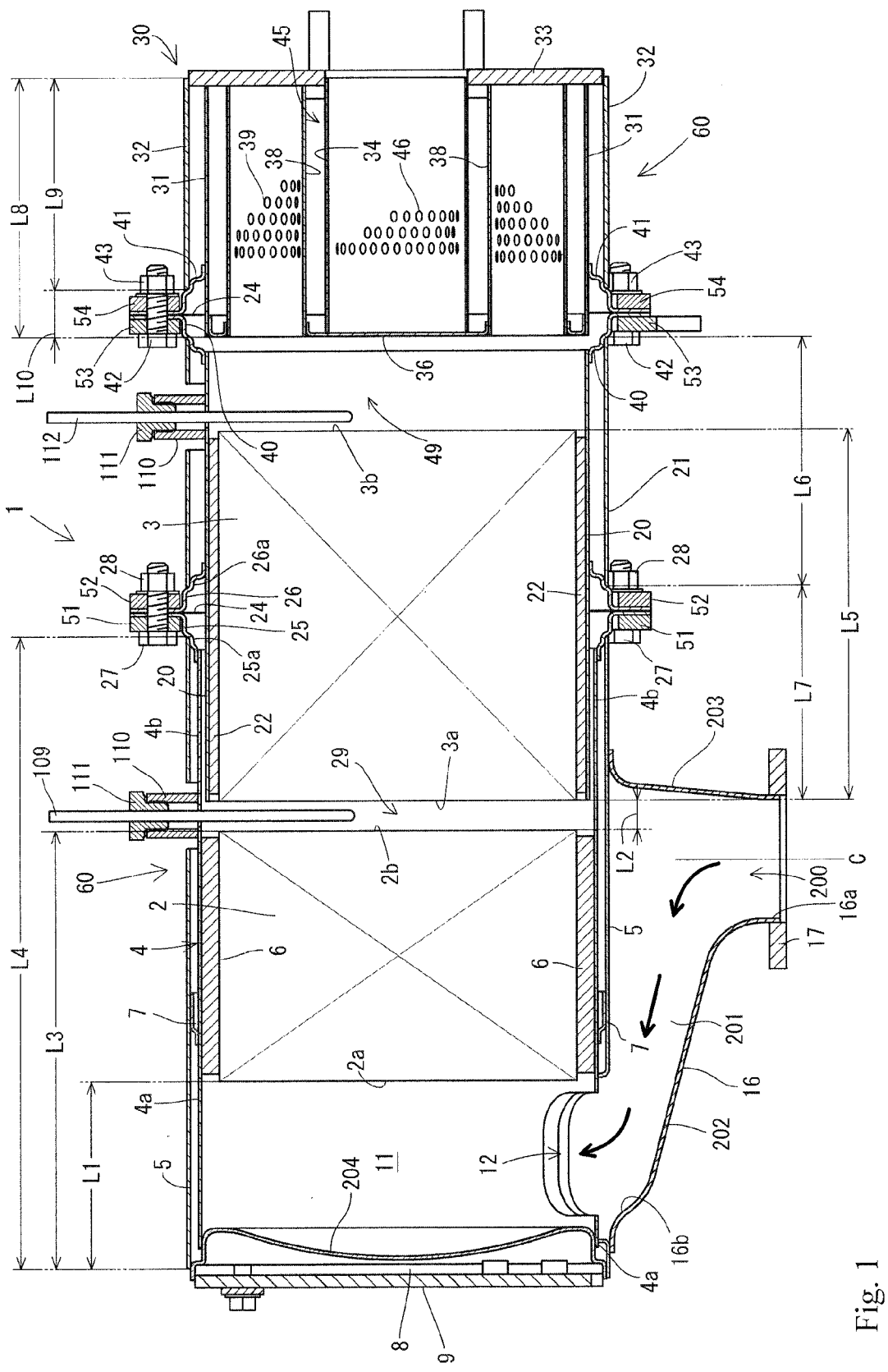
FIG. 1 is an explanatory view of a cross section of a DPF.
Figure 2:
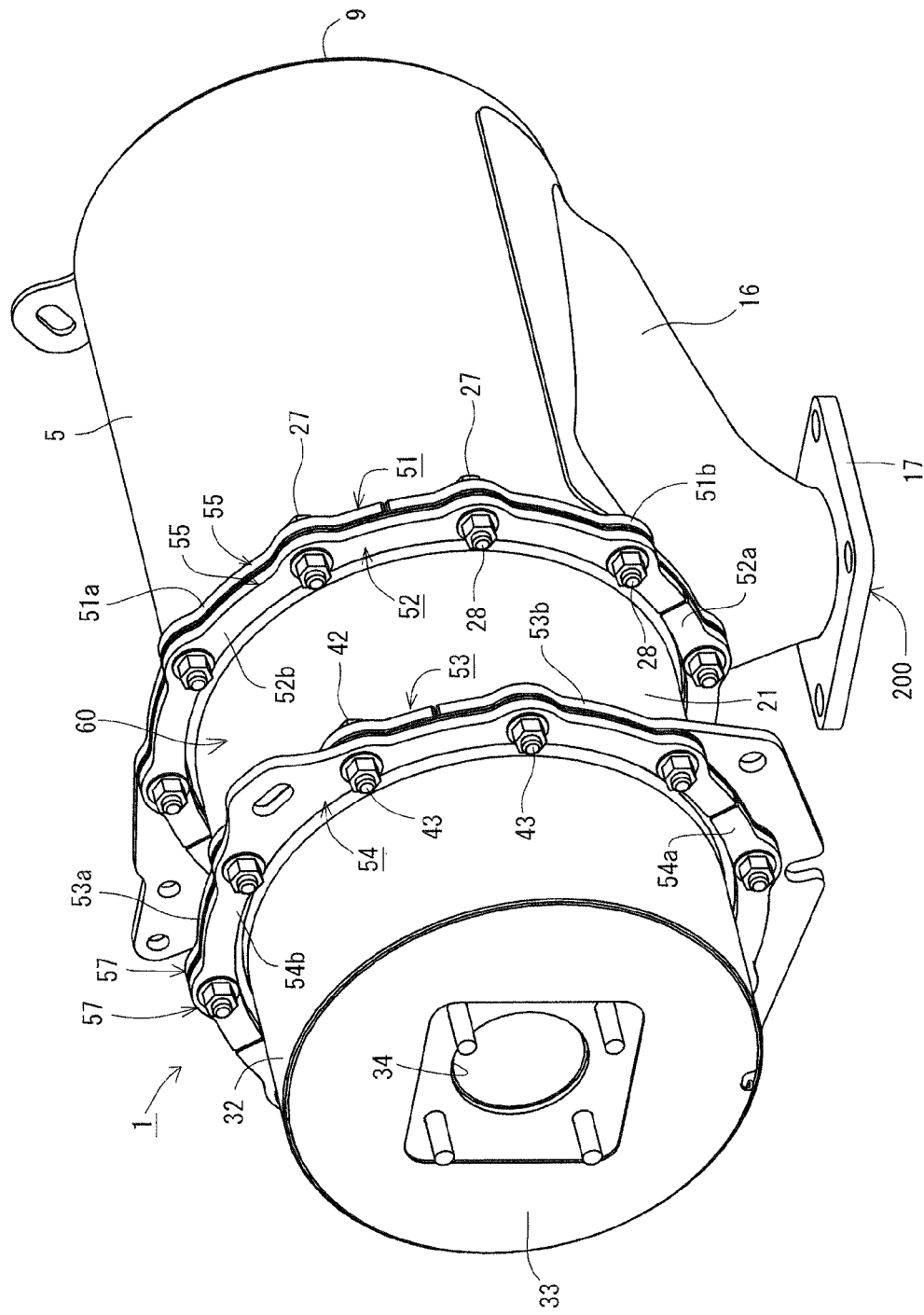
FIG. 2 is a perspective view of an outer appearance of the DPF.
Figure 3:
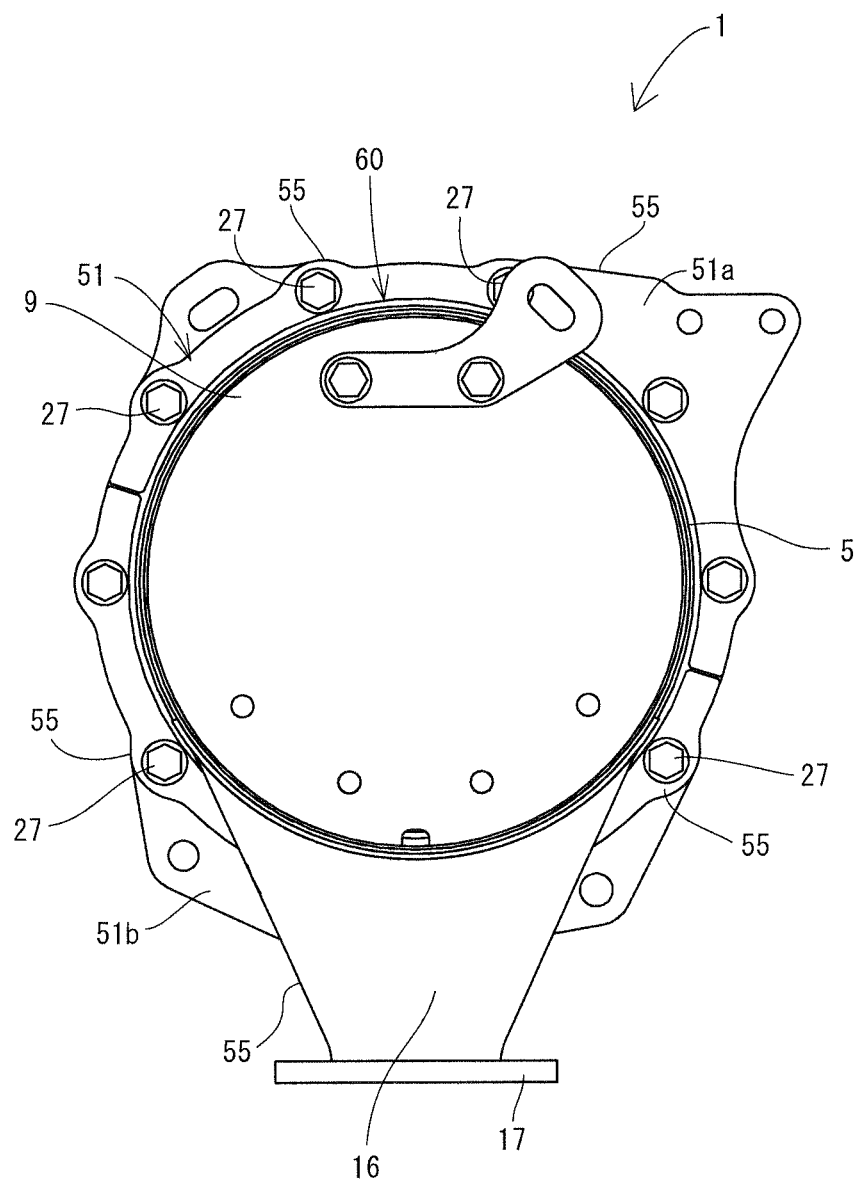
FIG. 3 is a side elevational view of an outer appearance in an exhaust gas upstream side in the DPF.
Figure 4:
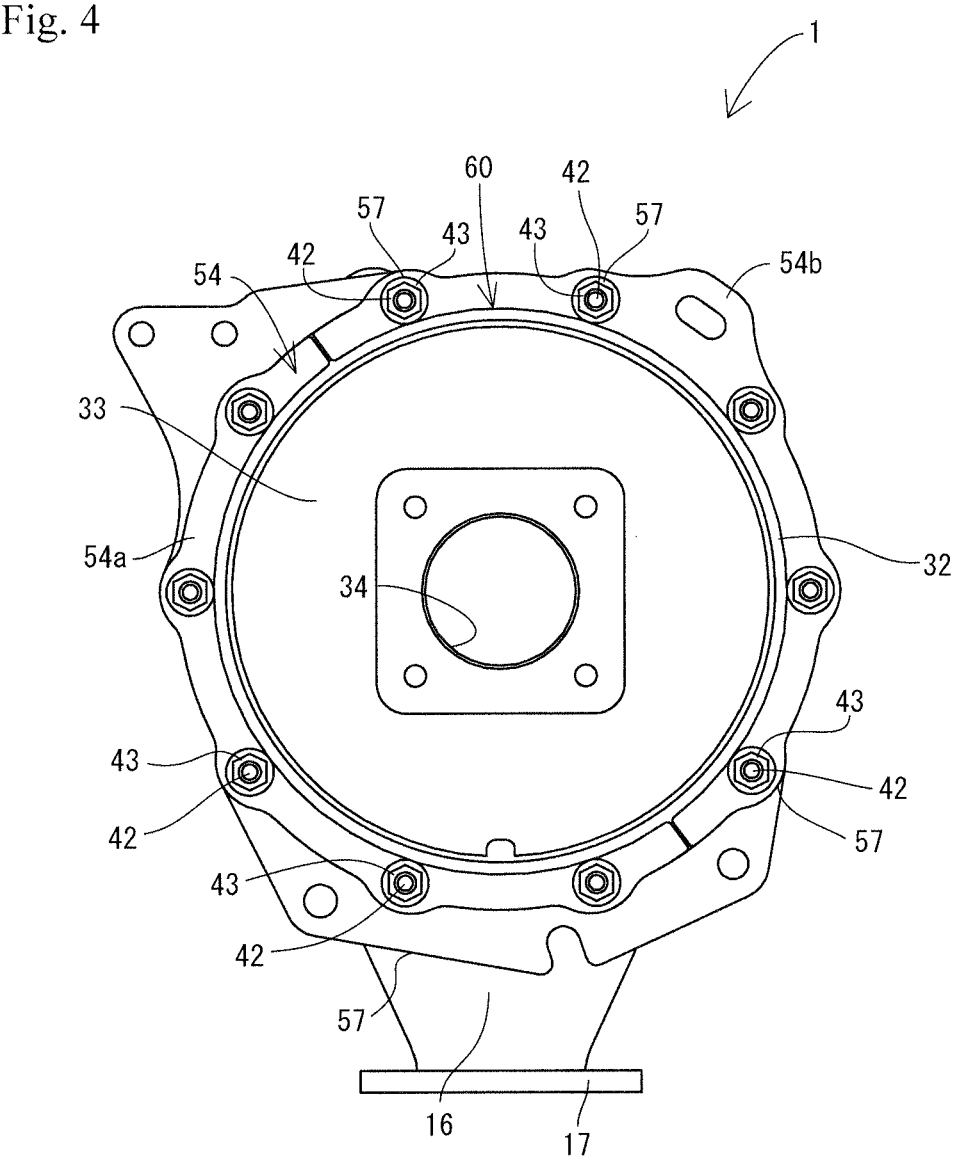
FIG. 4 is a side elevational view of an outer appearance in an exhaust gas downstream side in the DPF.

A description will be given below of an exhaust gas purification device obtained by specifying the present invention with reference to the accompanying drawings. In the following description, an exhaust gas inflow port 12 side in a diesel particulate filter 1 is set to a left side, and a silencer 30 side is set to a right side. The terms indicating the particular directions and positions are used for the convenience of the description, and do not limit the technical range of the present invention.

(1) Outline Structure of Exhaust Gas Purification Device

First of all, a description will be given of an outline structure of an exhaust gas purification device with reference to FIGS. 1 to 4. As shown in FIGS. 1 to 4, continuous regeneration type diesel particulate filter 1 (hereinafter, refer to as DPF 1) is provided as the exhaust gas purification device. The DPF 1 is structured such as to reduce carbon monoxide (CO) and hydrocarbon (HC) in the exhaust gas of a diesel engine 70 as well as removing particulate matter (PM) in the exhaust gas of the diesel engine 70.

As shown in FIGS. 1 and 10 to 13, the DPF 1 serving as the exhaust gas purification device is provided for collecting the particulate matter (PM) and the like in the exhaust gas, and is constructed into an approximately cylindrical shape extending longer in a lateral direction which is parallel to an output shaft (a crank shaft) of the diesel engine 70. The DPF 1 is arranged on an exhaust manifold 71 of the engine 70. An exhaust gas inlet pipe 16 and an exhaust gas outlet pipe 34 are provided in laterally both sides (an upstream side and a downstream side in an exhaust gas moving direction) of the DPF 1 so as to be sorted to left and right sides of the diesel engine 70. The exhaust gas inlet pipe 16 corresponding to an exhaust gas intake side of the DPF 1 is detachably fastened by bolts to the exhaust manifold 71 of the diesel engine 70. A tail pipe (not shown) is connected to the exhaust gas outlet pipe 34 corresponding to an exhaust gas discharge side of the DPF 1.

As shown in FIGS. 1 to 4, the DPF 1 is structured such that a diesel oxidation catalyst 2, for example, made of platinum and a soot filter 3 having a honeycomb construction are accommodated in series in a DPF casing 60 corresponding to a purification casing made of a heat resistant metal material via cylindrical inside cases 4 and 20. As shown in FIGS. 14 to 17, the DPF 1 is attached to a cylinder head 72 and an exhaust manifold 71 of the diesel engine 70 via a flange side bracket leg 61 and a casing side bracket leg 62 which correspond to a support body.

In this case, a base end side of the flange side bracket leg 61 is detachably fastened by bolts to a filter side junction flange 26 (details thereof will be mentioned later) which exists in an outer peripheral side of the DPF casing 60. Further, a base end side of the casing side bracket leg 62 is detachably fastened by bolts to a catalyst outer lid body 9 (details thereof will be mentioned later) of the DPF casing 60. A leading end side of the flange side bracket leg 61 is detachably fastened by bolts to a side surface in a cooling fan 76 side in the cylinder head 72. A leading end side of the casing side bracket leg 62 is detachably fastened by bolts to a side surface in a flywheel housing 78 side in the cylinder head 72.

The DPF 1 is connected in a communication manner to the exhaust manifold 71 via the exhaust gas inlet pipe 16 by fastening an inlet flange body 17 (details thereof will be mentioned later) of the exhaust gas inlet pipe 16 to an outlet portion of the exhaust manifold 71. As a result, the DPF 1 is stably connected and supported to the exhaust manifold 71 and the cylinder head 72 which are highly rigid parts of the diesel engine 70 by the bracket legs 61 and 62. Therefore, it is possible to achieve damage suppression of the DPF 1 due to oscillation and the like.

In the structure mentioned above, the exhaust gas of the diesel engine 70 flows into the diesel oxidation catalyst 2 side within the DPF casing 60 from the exhaust manifold 71 of the diesel engine 70, and moves from the diesel oxidation catalyst 2 to the soot filter 3 side so as to be purified. The particulate matter in the exhaust gas can not go through a partition wall having a porous shape between the cells in the soot filter 3. In other words, the particulate matter in the exhaust gas is collected by the soot filter 3. Thereafter, the exhaust gas passing through the diesel oxidation catalyst 2 and the soot filter 3 is discharged out of the tail pipe.

If the temperature of the exhaust gas goes beyond a regenerable temperature (for example, about 300° C.) when the exhaust gas passes through the diesel oxidation catalyst 2 and the soot filter 3, NO (nitrogen monoxide) in the exhaust gas is oxidized to unstable $NO_2$ (nitrogen dioxide) on the basis of an action of the diesel oxidation catalyst 2. Further, the particulate matter collected by the soot filter 3 is oxidized and removed by O (oxygen) which is discharged when $NO_2$ gets back to NO. In the case that the particulate matter is piled up to the soot filter 3, the particulate matter is oxidized and removed by keeping the temperature of the exhaust gas at the regenerable temperature or higher. Therefore, a particulate matter collecting capacity of the soot filter 3 is recovered (the soot filter 3 is regenerated).

(2) Structure of Diesel Oxidation Catalyst

Next, a description will be given of a structure of the diesel oxidation catalyst 2 which is an example of the gas purification body (the filter) purifying the exhaust gas which the diesel engine 70 discharges, with reference to FIGS. 1, 5, and 9. The diesel oxidation catalyst 2 is provided within the catalyst inside case 4 which is made of a heat resistant metal material and is formed into an approximately cylindrical shape. The catalyst inside case 4 is provided within a catalyst outside case 5 which is made of a heat resistant metal material and is formed into an approximately cylindrical shape. In other words, the catalyst inside case 4 is fitted to an outer side of the diesel oxidation catalyst 2 via a catalyst heat insulation material 6 which is made of a ceramic fiber and is formed into a mat shape. The diesel oxidation catalyst 2 is protected by pressing the catalyst heat insulation material 6 into a portion between the diesel oxidation catalyst 2 and the catalyst inside case 4. Further, the catalyst outside case 5 is fitted to an outer side of the catalyst inside case 4 via a support body 7 which is formed into an approximately S-shaped form in its cross section and is made of a thin plate. The catalyst outside case 5 is one of elements which construct the DPF casing 60 mentioned above. Stress (mechanical oscillation and deforming force) of the catalyst outside case 5 transmitted to the catalyst inside case 4 is reduced by the thin support body 7.

Figure 5:
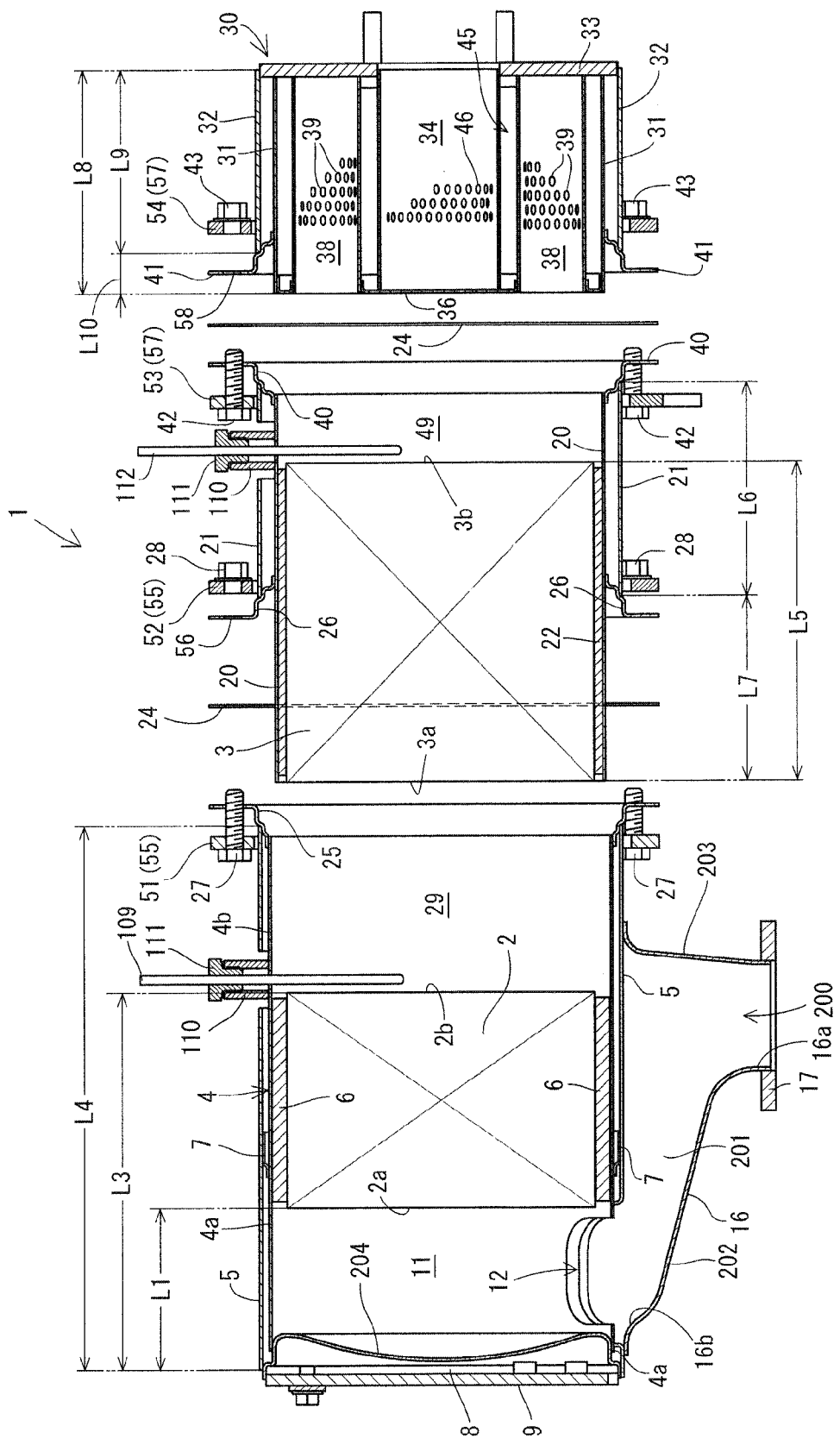
FIG. 5 is an explanatory view of a separated cross section of the DPF.
Figure 6:
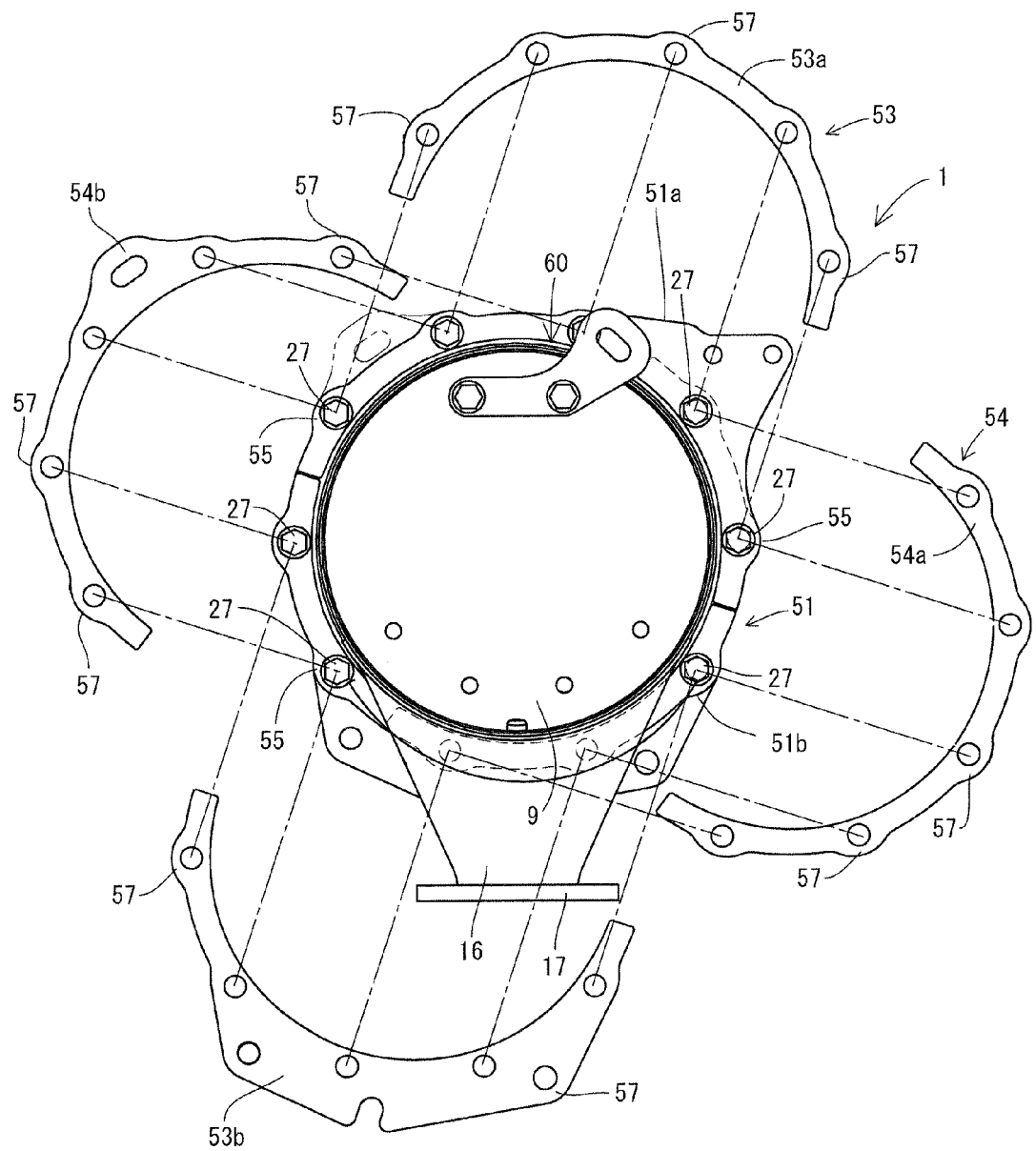
FIG. 6 is a separated side elevational view of a pinching flange.
Figure 9:
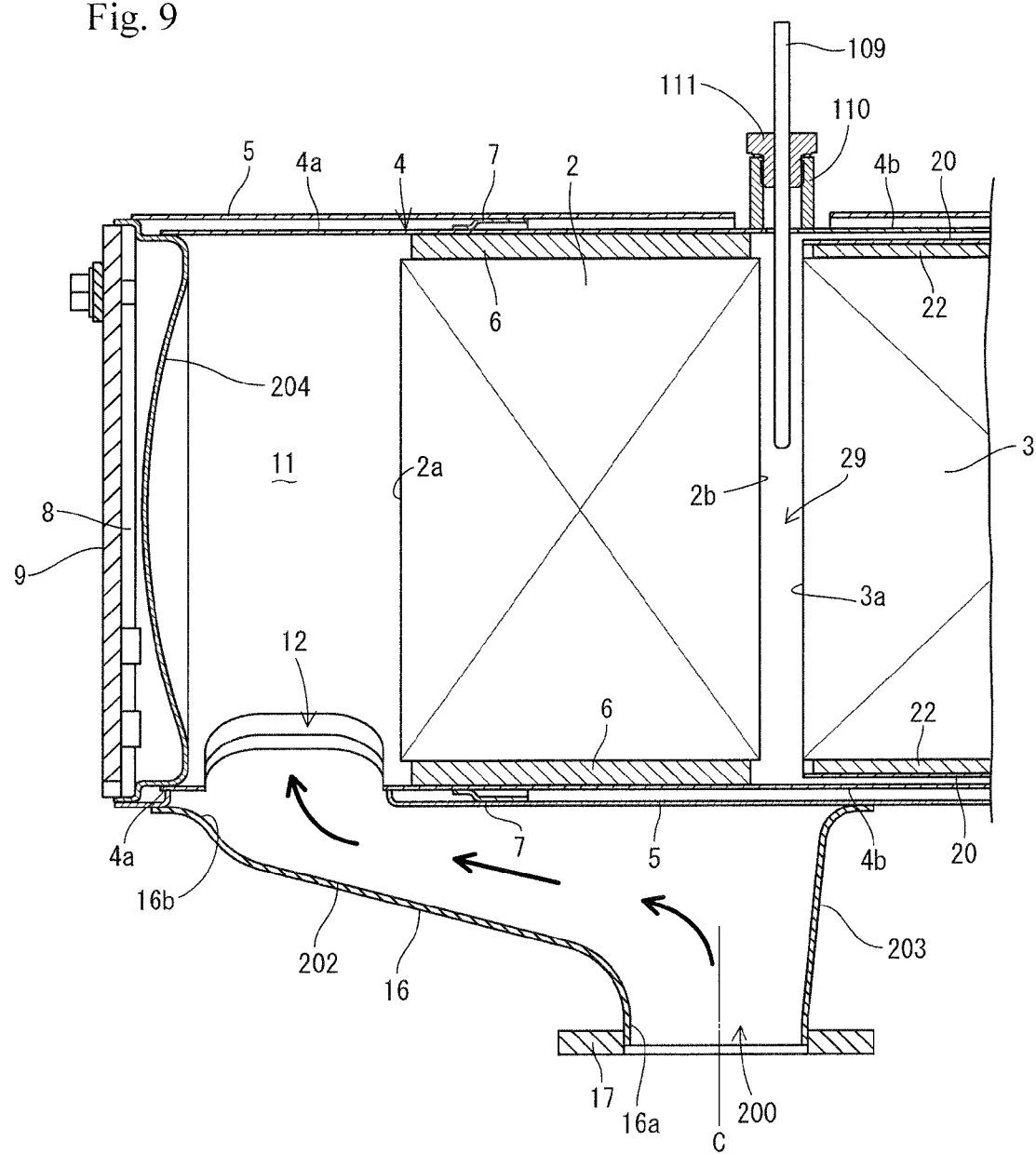
FIG. 9 is an enlarged cross sectional side elevational view of the exhaust gas upstream side in the DPF.
Figure 10:
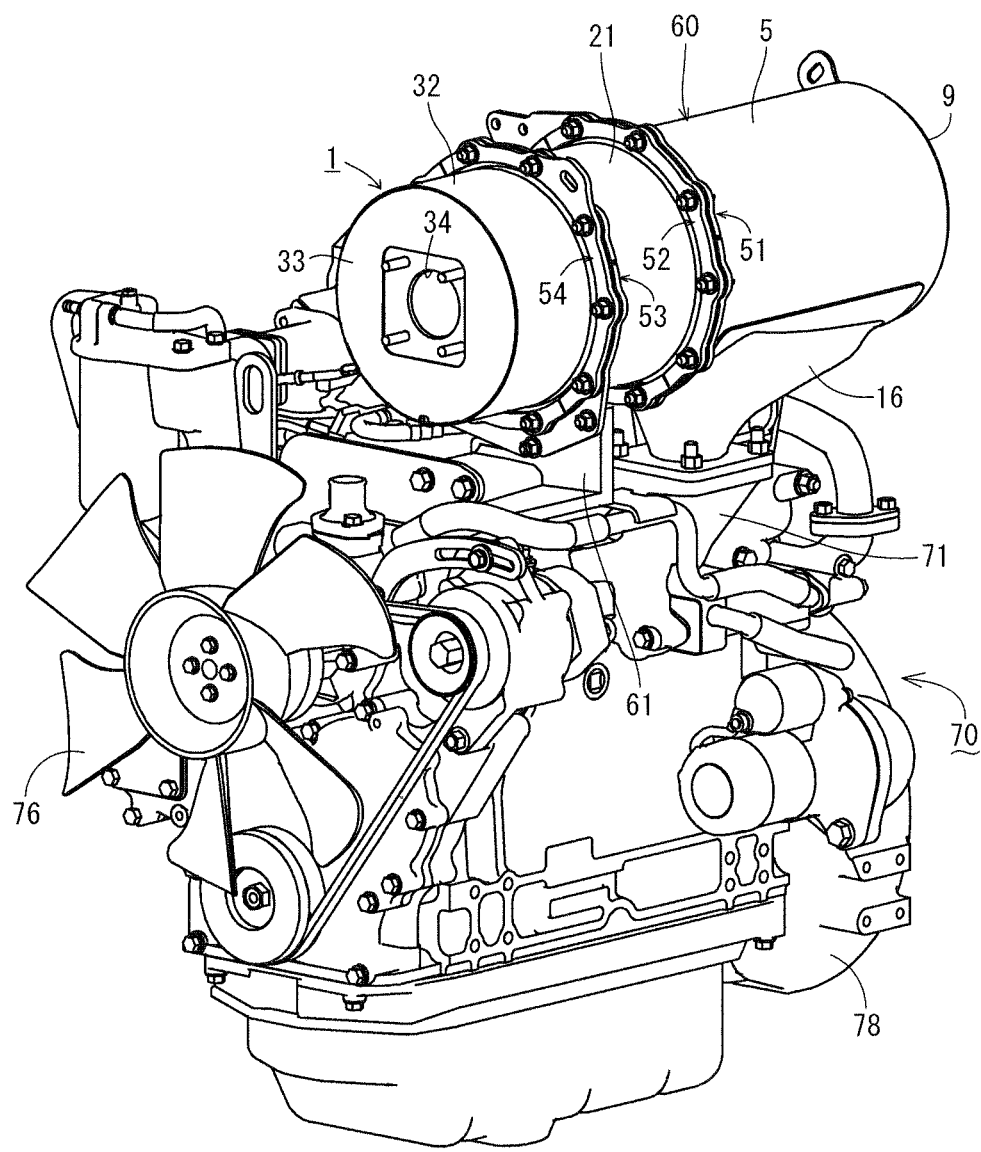
FIG. 10 is a perspective view of a diesel engine mounting the DPF thereon as seen from a cooling fan side.
Figure 11:
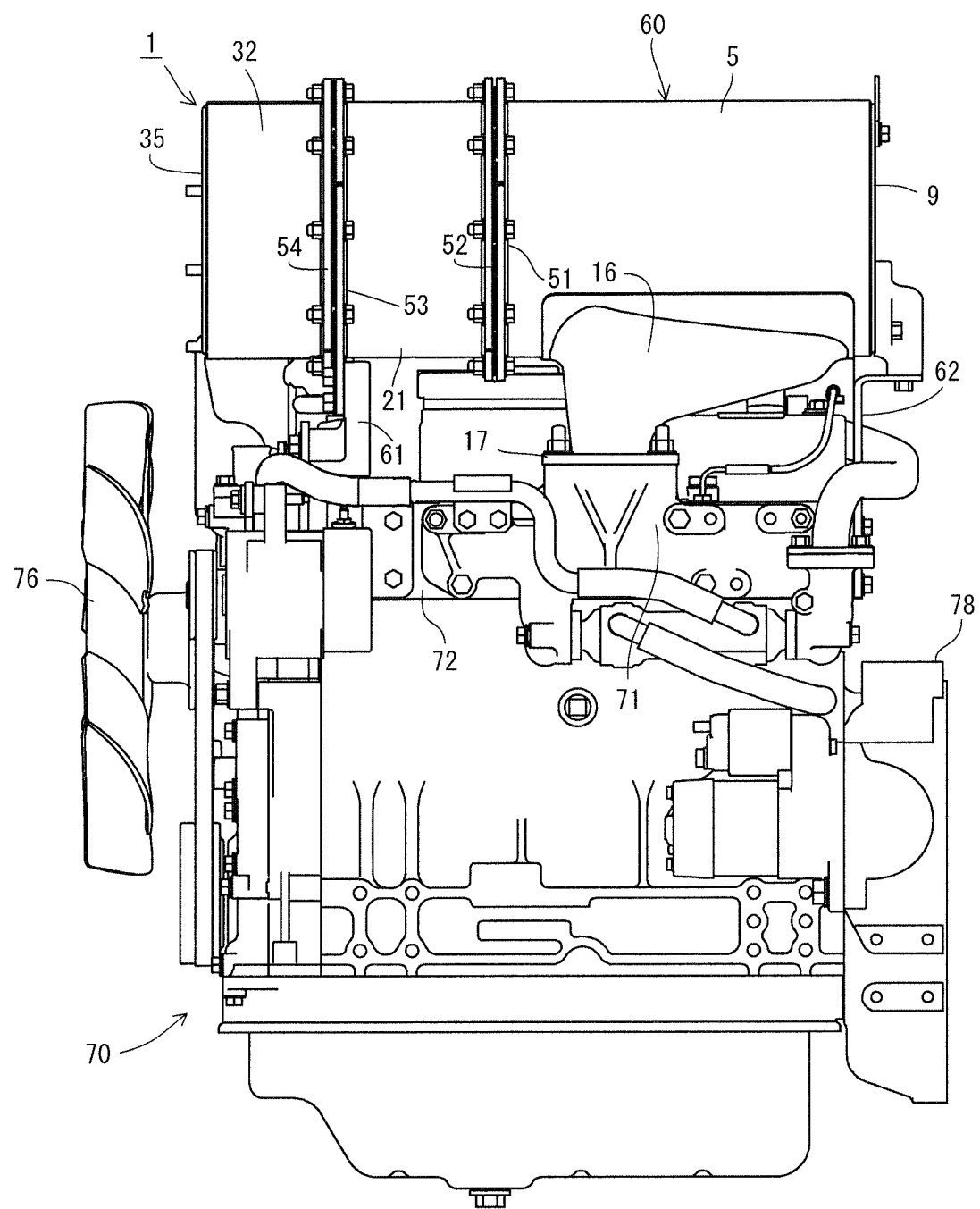
FIG. 11 is a side elevational view of the diesel engine mounting the DPF thereon as seen from an exhaust manifold side.
Figure 12:
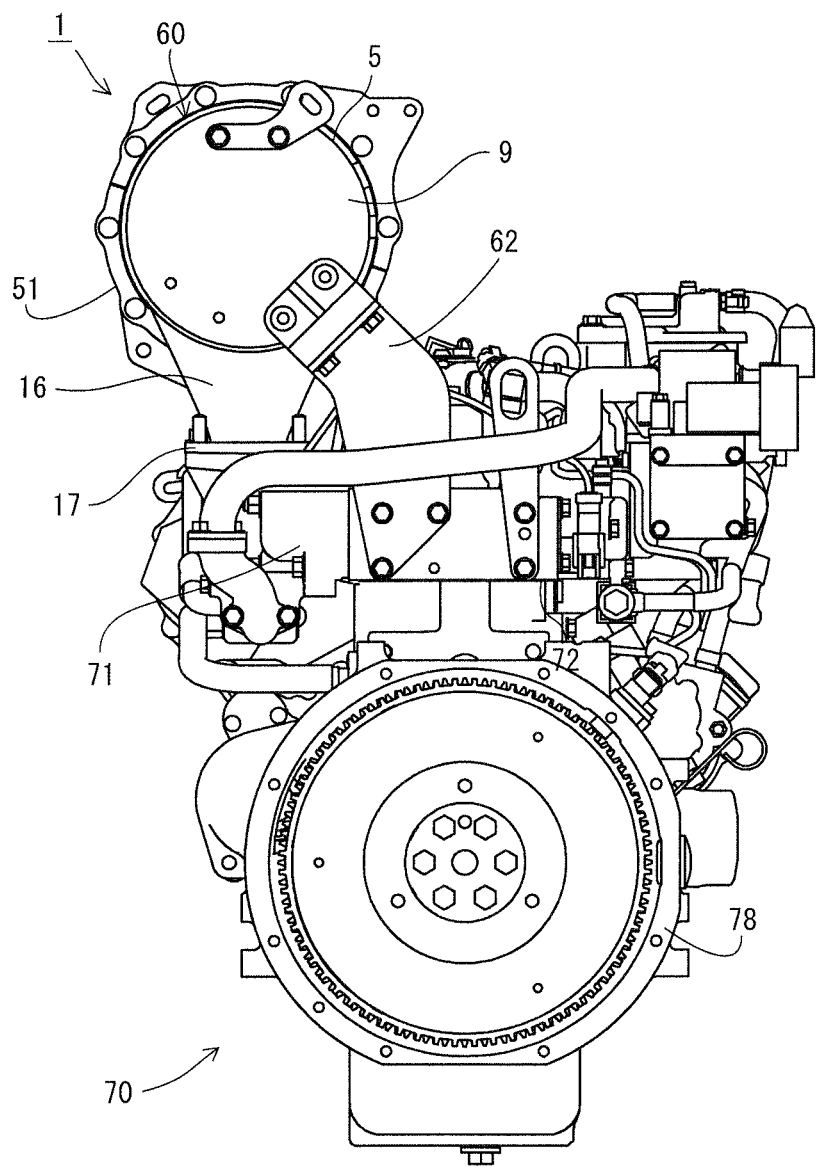
FIG. 12 is a side elevational view of the diesel engine mounting the DPF thereon as seen from a flywheel side.

As shown in FIGS. 1, 5, and 9, a discoid catalyst inner lid body 8 is firmly fixed by welding to one side end surfaces of the catalyst inside case 4 and the catalyst outside case 5. The catalyst outer lid body 9 is fastened by bolts and nuts to an outer surface side of the catalyst inner lid body 8. A gas inflow side end surface 2a of the diesel oxidation catalyst 2 and the catalyst inner lid body 8 are spaced at a fixed distance L1 (a gas inflow space 11). An exhaust gas inflow space 11 is formed between the gas inflow side end surface 2a of the diesel oxidation catalyst 2 and the catalyst inner lid body 8. An exhaust gas inflow port 12 facing to the exhaust gas inflow space 11 is open to the catalyst inside case 4 and the catalyst outside case 5. An opening edge of the exhaust gas inflow port 12 in the catalyst outside case 5 is formed by being folded toward the catalyst inside case 4. Since a gap between an opening edge of the catalyst inside case 4 and an opening edge of the catalyst outside case 5 is closed by the folded edge, it is possible to prevent the exhaust gas from flowing into the portion between the catalyst inside case 4 and the catalyst outside case 5.

As shown in FIGS. 1, 5, and 9, an exhaust gas inlet pipe 16 is arranged in an outside surface of the catalyst outside case 5 in which the exhaust gas inflow port 12 is formed. The exhaust gas inlet pipe 16 is formed into a split tubular shape which is open upward, and a rectangular upward opening end portion 16b corresponding to a large diameter side is fixed by welding to the outside surface of the catalyst outside case 5 in such a manner as to cover the exhaust gas inflow port 12 and extend in a longitudinal (lateral) direction of the catalyst outside case 5. Therefore, the upward opening end portion 16b corresponding to an exhaust gas outlet side of the exhaust gas inlet pipe 16 is connected in a communication manner to the exhaust gas inflow port 12 of the catalyst outside case 5. A downward opening end portion 16a having a small diameter and formed into a perfect circular shape is open as an exhaust gas inlet side to a right end portion which exists closer to a longitudinally midstream portion of the catalyst outside case 5 in the exhaust gas inlet pipe 16. An inlet flange body 17 is fixed by welding to an outer peripheral portion of the downward opening end portion 16a. The inlet flange body 17 is detachably fastened by bolts to an exhaust gas discharge side of the exhaust manifold 71.

As shown in FIGS. 1, 5, and 9, a left end portion side of the exhaust gas inlet pipe 16 covers the exhaust gas inflow port 12 of the catalyst outside case 5 from an outer side. The downward opening end portion 16a corresponding to the exhaust gas inlet side is formed in a right end portion of the exhaust gas inlet pipe 16. In other words, the downward opening end portion 16a of the exhaust gas inlet pipe 16 is provided so as to offset to an exhaust gas downstream side in the DPF casing 60 (provided so as to be deviated to a right side of the catalyst outside case 5) in relation to the exhaust gas inflow port 12. Further, the upward opening end portion 16b of the exhaust gas inlet pipe 16 is fixed by welding to the outside surface of the catalyst outside case 5 so as to cover the exhaust gas inflow port 12 and extend in a longitudinal (lateral) direction of the catalyst outside case 5. Accordingly, an introduction passage 200 of the exhaust gas is formed by the outside surface of the catalyst outside case 5 and an inside surface of a pipe wall 201 of the exhaust gas inlet pipe 16. As a result, it is possible to heat up the DPF casing 60 (the catalyst outside case 5) by the exhaust gas within the exhaust gas inlet pipe 16 (within the introduction passage 200), and it is possible to inhibit the temperature of the exhaust gas passing through the DPF casing 60 (the catalyst outside case 5) from being lowered. Therefore, it is possible to improve the exhaust gas purification performance of the DPF 1. Further, the exhaust gas inlet pipe 16 can be utilized as a reinforcing member of the DPF casing 60 (the catalyst outside case 5), and it is possible to achieve improvement of rigidity of the DPF casing 60 (the catalyst outside case 5) by a simple structure without making the DPF casing 60 (the catalyst outside case 5) thicker and extremely increasing the parts number.

In the structure mentioned above, the exhaust gas of the diesel engine 70 enters into the exhaust gas inlet pipe 16 from the exhaust manifold 71, enters into the exhaust gas inflow space 11 from the exhaust gas inlet pipe 16 via the exhaust gas inflow port 12, and is supplied to the diesel oxidation catalyst 2 from the gas inflow side end surface 2a in the left side of the diesel oxidation catalyst 2. The nitrogen dioxide ($NO_2$) is created on the basis of the oxidation action of the diesel oxidation catalyst 2.

As shown in FIGS. 1, 5, and 9, a portion extending along the DPF casing 60 (the catalyst outside case 5) in the pipe wall 201 of the exhaust gas inlet pipe 16 is formed into a longitudinally inclined portion 202 which is inclined so as to come close to the outside surface of the DPF casing 60 (the catalyst outside case 5) gradually toward the exhaust gas outlet side (the upward opening end portion 16*b*) from the exhaust gas inlet side (the downward opening end portion 16*a*) of the exhaust gas inlet pipe 16. In other words, the portion extending along the DPF casing 60 (the catalyst outside case 5) in the pipe wall 201 forms the longitudinally inclined portion 202 which is formed into a shape obtained by cutting off a corner in a side elevational view. An inside surface of the longitudinally inclined portion 202 of the exhaust gas inlet pipe 16 is covered on the exhaust gas inflow port 12 of the DPF casing 60 (the catalyst outside case 5), and is structured such as to drift the exhaust gas flowing from the exhaust manifold 71 to a direction of the exhaust gas inflow port 12.

In the structure mentioned above, the exhaust gas flowing into the exhaust gas inlet pipe 16 from the exhaust manifold 71 comes into collision with the inside surface of the longitudinally inclined portion 202 of the exhaust gas inlet pipe 16 so as to drift toward the exhaust gas inflow port 12, and is smoothly guided into the exhaust gas inflow space 11 via the exhaust gas inflow port 12. In other words, the exhaust gas inlet pipe 16 can be utilized as the reinforcing member of the DPF casing 60 (the catalyst outside case 5) while employing the inside surface of the longitudinally inclined portion 202 of the exhaust gas inlet pipe 16 as the guide surface feeding the exhaust gas to the exhaust gas inflow port 12, and it is possible to smoothly guide the exhaust gas from the exhaust manifold 71 into the DPF casing 60 (the catalyst outside case 5) by the inside surface of the longitudinally inclined portion 202 of the exhaust gas inlet pipe 16 while achieving the improvement of rigidity of the DPF casing 60 (the catalyst outside case 5) with the simple structure without making the DPF casing 60 (the catalyst outside case 5) thicker and extremely increasing the parts number. Therefore, it is possible to supply the exhaust gas to a wide area of the diesel oxidation catalyst 2 which corresponds to the gas purification body within the DPF casing 60 (the catalyst outside case 5), thereby contributing to efficient utilization of the diesel oxidation catalyst 2.

As shown in FIGS. 1, 5, and 9, a portion which also corresponds to an exhaust gas outflow port in the pipe wall 201 of the exhaust gas inlet pipe 16 and is close to the exhaust gas outlet pipe 34 is formed in a short-direction inclined portion 203 which is inclined so as to move away from a center line C (refer to FIGS. 1 and 9) of the exhaust gas inlet side (the downward opening end portion 16*a*) gradually toward the exhaust gas outlet side (the upward opening end portion 16*b*) from the exhaust gas inlet side (the downward opening end portion 16*a*) of the exhaust gas inlet pipe 16. In other words, an approximately half portion close to the exhaust gas outlet pipe 34 in the pipe wall 201 forms the short-direction inclined portion 203 which is widened in radius toward the upward opening end portion 16*b* from the downward opening end portion 16*a* and is formed into a trumpet shape. In this case, the exhaust gas comes into collision with the outside surface of the DPF casing 60 (the catalyst outside case 5) in the portion which is close to the exhaust gas outlet pipe 34 in the inside surface of the pipe wall 201 of the exhaust gas inlet pipe 16, however, a cubic capacity of the portion is secured. Therefore, the formation of the swirl flow and the turbulent flow can be carried out even in a side closer to the exhaust gas upstream than the exhaust gas inflow port 12. Accordingly, the exhaust gas can be uniformly supplied further securely by the end surface 2*a* (the gas inflow side end surface 2*a*) in the exhaust gas upstream side of the diesel oxidation catalyst 2.

As shown in FIGS. 1, 5, and 9, a concave surface portion 204 concaving outward is formed in an inner surface side of the catalyst inner lid body 8 in the side end surface which is close to the exhaust gas inflow port 12 in the DPF casing 60 (the catalyst outside case 5). Therefore, the catalyst inner lid body 8 is formed into a bowl shape obtained by concaving an approximately center portion in the inner surface side due to the existence of the concave surface portion 204. As a result, the exhaust gas can be supplied from the exhaust gas inflow port 12 of the DPF casing 60 (the catalyst outside case 5) toward the concave surface portion 204 of the catalyst inner lid body 8, and the swirl flow and the turbulent flow can be easily formed in the exhaust gas upstream side (the exhaust gas inflow space 11) of the diesel oxidation catalyst 2 on the basis of the exhaust gas diffusing action obtained by the concave surface portion 204. Therefore, the exhaust gas can be supplied to the end surface (the gas inflow side end surface 2*a*) in the exhaust gas upstream side of the diesel oxidation catalyst 2 as uniformly as possible.

(3) Structure of Soot Filter

Next, a description will be given of a structure of the soot filter 3 which is an example of the gas purification body (the filter) purifying the exhaust gas which the diesel engine 70 discharges, with reference to FIGS. 1, 5, and 9. The soot filter 3 is provided within the filter inside case 20 which is made of a heat resistant metal material and is formed into an approximately cylindrical shape. The filter inside case 20 is provided within a filter outside case 21 which is made of a heat resistant metal material and is formed into an approximately cylindrical shape. In other words, the filter inside case 20 is fitted to an outer side of the soot filter 3 via a filter heat insulation material 22 which is made of a ceramic fiber and is formed into a mat shape. The filter outside case 21 is one of the elements which construct the DPF casing 60 mentioned above together with the catalyst outside case 5. The soot filter 3 is protected by pressing the filter heat insulation material 22 into the portion between the soot filter 3 and the filter inside case 20.

As shown in FIGS. 1, 5, and 9, the catalyst inside case 4 formed into a cylindrical shape having a linear ridge line is constructed by an upstream side tube portion 4*a* which accommodates the diesel oxidation catalyst 2, and a downstream side tube portion 4*b* to which the filter inside case 20 mentioned later is inserted. The upstream side tube portion 4*a* and the downstream side tube portion 4*b* are cylinders having approximately the same diameters and are formed into an integral shape. Further, there are provided a catalyst side junction flange 25 which is fixed by welding to an outer periphery of the catalyst inside case 4 and is formed into a thin ring shape, and a filter side junction flange 26 which is fixed by welding to an outer periphery of the filter inside case 20 and is formed into a thin ring shape. The catalyst side junction flange 25 and the filter side junction flange 26 are formed into a donut shape which has an approximately L-shaped form in a cross section.

An inner peripheral side of the catalyst side junction flange 25 is fixed by welding to an end portion of the downstream side tube portion 4*b* in the catalyst inside case 4. An outer peripheral side of the catalyst side junction flange 25 is protruded out toward an outer peripheral side (a radial direction) of the catalyst outside case 5. A folded corner portion of the catalyst side junction flange 25 is formed into a stepped stage portion 25*a*. An end portion in the exhaust gas downstream side in the catalyst outside case 5 is fixed by welding to the stage portion 25*a* of the catalyst side junction flange 25. Meanwhile, an inner peripheral side of the filter side junction flange 26 is fixed by welding to a longitudinally midstream portion (a midstream portion in an exhaust gas moving direction) in the outer periphery of the filter inside case 20. An outer peripheral side of the filter side junction flange 26 is protruded out toward an outer peripheral side (a radial direction) of the filter outside case 21. A folded corner portion of the filter side junction flange 26 is also formed into a stepped stage portion 26*a*. An end portion in the exhaust gas upstream side in the filter outside case 21 is fixed by welding to the stage portion 26*a* of the filter side junction flange 26. The filter inside case 20 is formed into a cylindrical shape having a linear ridge line. The end portion in the exhaust gas upstream side and the end portion in the exhaust gas downstream side of the filter inside case 20 are cylinders having approximately the same diameters and are formed into an integral shape.

An outer diameter of the diesel oxidation catalyst 2 and an outer diameter of the soot filter 3 are formed to be equal. A thickness of the catalyst heat insulation material 6 is formed larger than a thickness of the filter heat insulation material 22. On the other hand, the catalyst inside case 4 and the filter inside case 20 are formed by a material having the same thickness. The outer diameter of the filter inside case 20 is formed smaller than the inner diameter of the downstream side tube portion 4*b* of the catalyst inside case 4. A downstream side gap 23 is formed between the inner peripheral surface of the catalyst inside case 4 and the outer peripheral surface of the filter inside case 20. The downstream side gap 23 is formed into a dimension (for example, 2 mm) which is greater than the thickness (for example, 1.5 mm) of each of the cases 4 and 20. According to the structure, the end portion in the exhaust gas upstream side of the filter inside case 20 can be easily taken in and out of the downstream side tube portion 4*b* of the catalyst inside case 4, for example, even if each of the cases 4 and 20 is rusted or thermally deformed.

As shown in FIGS. 1 to 5 and 8, the catalyst side junction flange 25 and the filter side junction flange 26 are confronted via the gasket 24. The junction flanges 25 and 26 are pinched from both sides in the exhaust gas moving direction by a pair of central pinching flanges 51 and 52 which surround the outer peripheral sides of the outside cases 5 and 21 and are formed into thick plates. The catalyst outside case 5 and the filter outside case 21 are detachably connected by fastening the central pinching flanges 51 and 52 by bolts 27 and nuts 28 and pinching the junction flanges 25 and 26 by the central pinching flanges 51 and 52.

Figure 8:
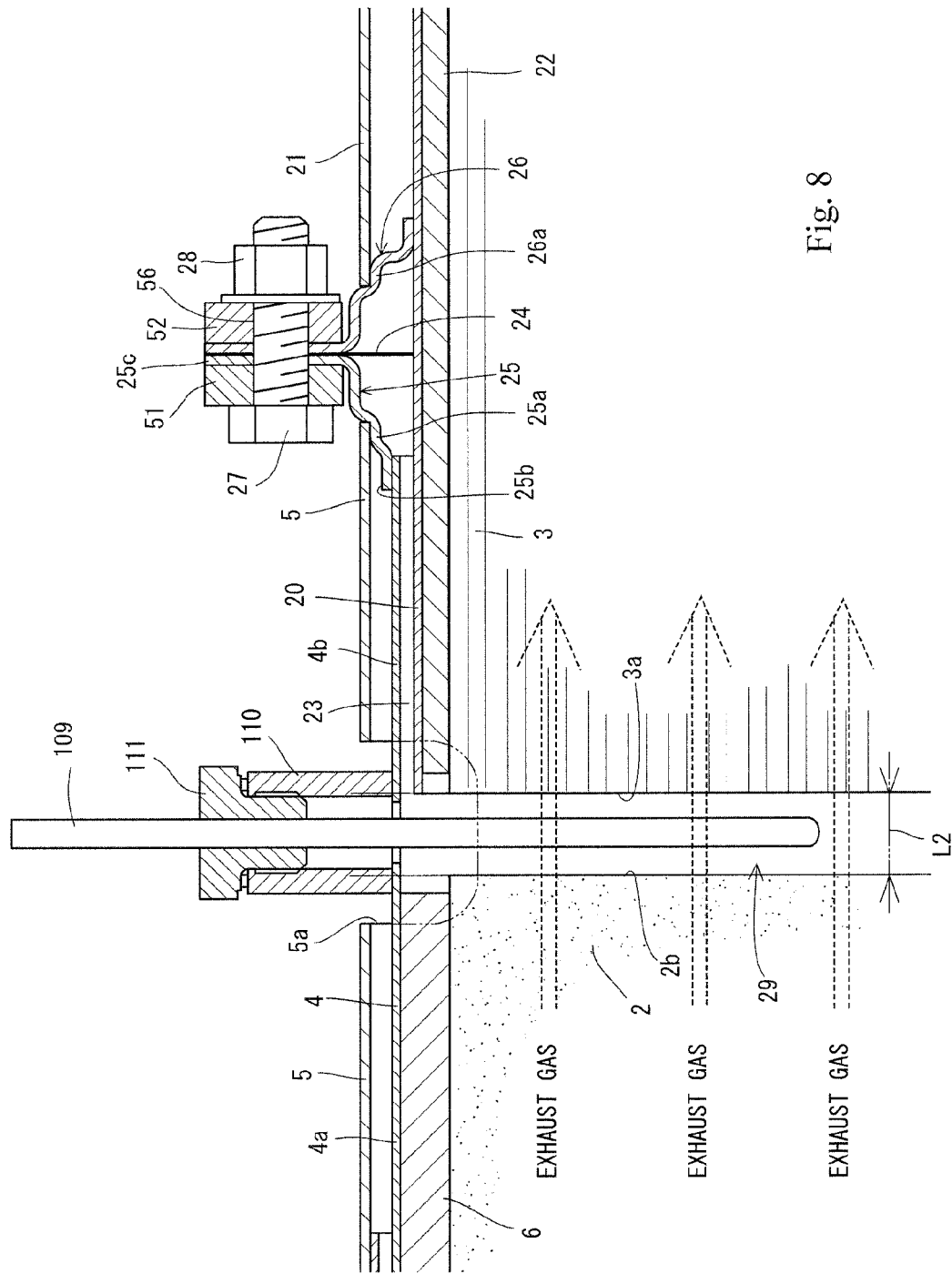
FIG. 8 is an enlarged cross sectional view showing an attaching portion of a sensor boss body existing in the exhaust gas upstream side.

As shown in FIGS. 1 and 8, a catalyst downstream side space 29 is formed between the diesel oxidation catalyst 2 and the soot filter 3 in a state in which an end portion in the exhaust gas upstream side of the filter outside case 21 is connected to an end portion in the exhaust gas downstream side of the catalyst outside case 5 via the central pinching flanges 51 and 52 and the junction flanges 25 and 26. In other words, the gas outflow side end surface 2*b* of the diesel oxidation catalyst 2 faces to the intake side end surface 3*a* of the soot filter 3 (the filter inside case 20) while being spaced at a sensor attaching distance L2.

As shown in FIGS. 1 and 5, a cylinder length L4 in the exhaust gas moving direction of the catalyst outside case 5 is formed to be longer than a cylinder length L3 in the exhaust gas moving direction of the upstream side tube portion 4*a* in the catalyst inside case 4. A cylinder length L6 in the exhaust gas moving direction of the filter outside case 21 is formed to be shorter than a cylinder length L5 in the exhaust gas moving direction of the filter inside case 20. A length (L2+L3+L5) obtained by adding the sensor attaching distance L2 of the catalyst downstream side space 29, the cylinder length L3 of the upstream side tube portion 4*a* of the catalyst inside case 4, and the cylinder length L5 of the filter inside case 20 is structured such as to be approximately equal to a length (L4+L6) obtained by adding the cylinder length L4 of the catalyst outside case 5 and the cylinder length L6 of the filter outside case 21.

Further, the end portion in the exhaust gas upstream side of the filter inside case 20 protrudes out of the end portion in the exhaust gas upstream side of the filter outside case 21 at a difference (L7≈L5−L6) of the lengths of the cases 20 and 21. As a result, in a state in which the filter outside case 21 is connected to the catalyst outside case 5, the end portion in the exhaust gas upstream side of the filter inside case 20 is inserted to the exhaust gas downstream side of the catalyst outside case 5 (the downstream side tube portion 4*b* in the catalyst inside case 4) at the exhaust gas upstream side dimension L7 of the filter inside case 20 which protrudes out of the filter outside case 21. In other words, the exhaust gas upstream side of the filter inside case 20 is inserted into the downstream side tube portion 4*b* (the catalyst downstream side space 29) so as to be insertable and removable. As is known from the description mentioned above and FIG. 1, the flange bodies (the catalyst side junction flange 25 and the filter side junction flange 26) connecting the catalyst outside case 5 and the filter outside case 21 are offset in relation to the connection boundary position (the catalyst downstream side space 29) between the diesel oxidation catalyst 2 and the soot filter 3. In other words, the attaching positions of the catalyst side junction flange 25 and the filter side junction flange 26 are deviated in relation to the catalyst downstream side space 29.

In the structure mentioned above, the nitrogen dioxide ($NO_2$) created by the oxidation action of the diesel oxidation catalyst 2 is supplied into the soot filter 3 from the one side end surface (the intake side end surface 3*a*). The particulate matter (PM) included in the exhaust gas of the diesel engine 70 is collected by the soot filter 3, and is continuously oxidized and removed by the nitrogen dioxide ($NO_2$). In addition to the removal of the particulate matter (PM) in the exhaust gas of the diesel engine 70, the contents of the carbon monoxide (CO) and the hydrocarbon (HC) in the exhaust gas of the diesel engine 70 are reduced.

(4) Structure of Silencer

Next, a description will be given of a structure of the silencer 30 which attenuates sound of the exhaust gas which the diesel engine 70 discharges, with reference to FIGS. 1 and 5. As shown in FIGS. 1 and 5, the silencer 30 attenuating the sound of the exhaust gas which the diesel engine 70 discharges has a sound absorbing inside case 31 which is made of a heat resistant metal material and is formed into an approximately cylindrical shape, a sound absorbing outside case 32 which is made of a heat resistant metal material and is formed into an approximately cylindrical shape, and a sound absorbing outer lid body 33 which is firmly fixed by welding to a side end surface in an exhaust gas downstream side of the sound absorbing outside case 32 and is formed into a discoid shape. The sound absorbing inside case 31 is provided within the sound absorbing outside case 32. The sound absorbing outside case 32 constructs the DPF casing 60 mentioned above together with the catalyst outside case 5 and the filter outside case 21. A diameter of the cylindrical sound absorbing outside case 32 is approximately the same dimension as a diameter of the cylindrical catalyst outside case 5 and a diameter of the cylindrical filter outside case 21.

A discoid sound absorbing inner lid body 36 is firmly fixed by welding to an end portion in an exhaust gas upstream side in the sound absorbing inside case 31. A pair of exhaust gas introduction pipes 38 extending in parallel to the exhaust gas moving direction is provided within the sound absorbing inside case 31. The exhaust gas upstream side of each of the exhaust gas introduction pipes 38 passes through the sound absorbing inner lid body 36, however, a position of an end portion in the exhaust gas upstream side of each of the exhaust gas introduction pipes 38 approximately coincides with a position of an end portion in the exhaust gas upstream side of the sound absorbing inside case 31 in a side cross sectional view. The end portion in the exhaust gas upstream side in each of the exhaust gas introduction pipes 38 is open as it is. A lot of communication holes 39 are formed in each of the exhaust gas introduction pipes 38. Each of the exhaust gas introduction pipes 38 is communicated with an expansion chamber 45 via the communication holes 39. The expansion chamber 45 is formed in an inner portion of the sound absorbing inside case 31 (between the sound absorbing inner lid body 36 and the sound absorbing outer lid body 33).

The exhaust gas outlet pipe 34 arranged between the exhaust gas introduction pipes 38 is passed through the sound absorbing outer lid body 33 of the sound absorbing outside case 32. The exhaust gas upstream side of the exhaust gas outlet pipe 34 is closed by the sound absorbing inner lid body 36. A lot of exhaust holes 46 are formed at a position within the sound absorbing inside case 31 in the exhaust gas outlet pipe 34. Each of the exhaust gas introduction pipes 38 is communicated with the exhaust gas outlet pipe 34 via a lot of communication holes 39, the expansion chamber 45, and a lot of exhaust holes 46. A tail pipe (not shown) is connected to the other end side of the exhaust gas outlet pipe 34. In the structure mentioned above, the exhaust gas entering into both the exhaust gas introduction pipes 38 of the sound absorbing inside case 31 passes through the exhaust gas outlet pipe 34 via a plurality of communication holes 39, the expansion chamber 45, and a lot of exhaust holes 46, and is discharged out of the silencer 30 via the tail pipe.

As shown in FIGS. 1 and 5, an inner diameter side of the filter outlet side junction flange 40 formed into the thin ring shape is fixed by welding to the end portion in the exhaust gas downstream side of the filter inside case 20. An outer diameter side of the filter outlet side junction flange 40 is protruded toward an outer peripheral side (a radially outer side, a radial direction) of the filter outside case 21. The end portion in the exhaust gas downstream side of the filter outside case 21 is fixed by welding to an outer peripheral side of the filter outlet side junction flange 40. A sound absorbing side junction flange 41 protruding to an outer peripheral side (a radially outer side) of the sound absorbing outside case 32 and formed into a thin plate is fixed by welding to an end portion in the exhaust gas upstream side of the sound absorbing inside case 31. An end portion in the exhaust gas upstream side of the sound absorbing outside case 32 is fixed by welding to an outer peripheral side of the sound absorbing side junction flange 41. The end portion in the exhaust gas upstream side of the sound absorbing inside case 31 is protrudes at a predetermined cylinder dimension L10 to the exhaust gas upstream side of the sound absorbing side junction flange 41. Further, the filter inside case 20 and the sound absorbing inside case 31 are cylinders having approximately the same diameters, and the filter outside case 21 and the sound absorbing outside case 32 are cylinders having approximately the same diameters.

As shown in FIGS. 1 to 4 and 6, the filter outlet side junction flange 40 and the sound absorbing side junction flange 41 are confronted via the gasket 24, and the junction flanges 40 and 41 are pinched from both sides in the exhaust gas moving direction by a pair of thick outlet pinching flanges 53 and 54 which surround the outer peripheral sides of the outside cases 21 and 32. Further, the filter outside case 21 and the sound absorbing outside case 32 are detachably connected by fastening the outlet pinching flanges 53 and 54 to the junction flanges 40 and 41 by bolts 42 and nuts 43.

As shown in FIGS. 1 and 5, a cylinder length L9 in the exhaust gas moving direction of the sound absorbing outside case 32 is formed shorter than a cylinder length L8 in the exhaust gas moving direction of the sound absorbing inside case 31. The end portion in the exhaust gas upstream side of the sound absorbing inside case 31 protrudes at a difference (L10≈L8−L9) between the lengths of the cases 31 and 32 from the end portion (the junction flange 41) in the exhaust gas upstream side of the sound absorbing outside case 32. In other words, in a state in which the sound absorbing outside case 32 is connected to the filter outside case 21, the end portion in the exhaust gas upstream side of the sound absorbing inside case 31 is inserted to a filter downstream side space 49 which is formed within the end portion (the filter outlet side junction flange 40) in the exhaust gas downstream side of the filter outside case 21, at the dimension L10 at which the end portion in the exhaust gas upstream side of the sound absorbing inside case 31 protrudes out. As is known from the description mentioned above and FIG. 1, the flange body (the filter outlet side junction flange 40 and the sound absorbing side junction flange 41) connecting the filter outside case 21 and the sound absorbing outside case 32 is offset in relation to the connection boundary position (the filter downstream side space 49) of the soot filter 3. In other words, the attaching positions of the filter outlet side junction flange 40 and the sound absorbing side junction flange 41 are deviated in relation to the filter downstream side space 49.

According to the structure mentioned above, it is possible to shorten the length in the exhaust gas moving direction of the silencer 30 (the sound absorbing outside case 32) while securing the length in the exhaust gas moving direction of each of the exhaust gas introduction pipes 38. Therefore, in the DPF 1 with the silencer 30, the compact structure as a whole of the DPF 1 is compatible with maintenance and improvement of the sound absorbing function in the silencer 30.

(5) Connection Structure Between Adjacent Outside Cases

Next, a description will be given of a connection structure between the adjacent outside cases 5, 21, and 32, with reference to FIGS. 1 to 4 and 6. As shown in FIGS. 1 to 4 and 6, the thick central pinching flange 51 (52) is constructed by semicircular arc bodies 51a and 51b (52a and 52b) which are divided into a plurality of (two in the embodiment) sections in the peripheral direction of the catalyst outside case 5 (the filter outside case 21). Each of the semicircular arc bodies 51a and 51b (52a and 52b) according to the embodiment is formed into a circular arc shape (an approximately semicircular horseshoe). In a state in which the filter outside case 21 is connected to the catalyst outside case 5, end portions of the semicircular arc bodies 51a and 51b (52a and 52b) are confronted (brought into contact) along a circumferential direction. In other words, an outer peripheral side of the catalyst outside case 5 (the filter outside case 21) is annularly surrounded by the semicircular arc bodies 51*a* and 51*b* (52*a* and 52*b*).

A plurality of bolt fastening portions 55 with through holes are provided in the central pinching flange 51 (52) at even intervals along a circumferential direction. In the embodiment, the bolt fastening portions 55 are provided at ten positions per a set of central pinching flange 51. In the light of a unit of the semicircular arc bodies 51*a* and 51*b* (52*a* and 52*b*), the bolt fastening portions 55 are provided at five positions at even intervals along the circumferential direction. Meanwhile, bolts holes 56 corresponding to the bolt fastening portions 55 of the central pinching flange 51 (52) are formed in a penetrating manner in the catalyst side junction flange 25 and the filter side junction flange 26.

When connecting the catalyst outside case 5 and the filter outside case 21, the outer peripheral side of the filter outside case 21 is surrounded by both the semicircular are bodies 52*a* and 52*b* in the filter side as well as the outer peripheral side of the catalyst outside case 5 is surrounded by both the semicircular arc bodies 51*a* and 51*b* in the catalyst side, and the catalyst side junction flange 25 and the filter side junction flange 26 which pinch the gasket 24 are pinched from both sides in the exhaust gas moving direction by these semicircular arc bodies group (the central pinching flanges 51 and 52). Next, the bolts 27 are inserted into the bolt holes 56 of the bolt fastening portions 55 in the central pinching flanges 51 and 52 in both sides, and both the junction flanges 25 and 26, and are fastened by the nuts 28. As a result, both the junction flanges 25 and 26 are pinched and fixed by both the central pinching flanges 51 and 52, and the connection between the catalyst outside case 5 and the filter outside case 21 is finished. The confronting portions between the end portions of the semicircular arc bodies 51*a* and 51*b* in the catalyst side and the semicircular arc bodies 52*a* and 52*b* in the filter side are structured such as to be positioned so as to be shifted at a phase of 72° from each other.

As shown in FIGS. 1 to 4, the thick outlet pinching flange 53 (54) is constructed by semicircular arc bodies 53*a* and 53*b* (54*a* and 54*b*) which are divided into a plurality of (two in the embodiment) sections in the peripheral direction of the filter outside case 21 (the sound absorbing outside case 32). The semicircular arc bodies 53*a* and 53*b* (54*a* and 54*b*) according to the embodiment are basically formed into the same structure as that of the semicircular arc bodies 51*a* and 51*b* (52*a* and 52*b*) of the central pinching flange 51 (52). A plurality of bolt fastening portions 57 with through holes are provided in the outlet pinching flange 53 (54) at even intervals along the peripheral direction. Meanwhile, bolt holes 58 corresponding to the bolt fastening portions 57 of the outlet pinching flange 53 (54) are formed in a penetrating manner in the filter outlet side junction flange 40 and the sound absorbing side junction flange 41.

When connecting the filter outside case 21 and the sound absorbing outside case 32, the outer peripheral side of the sound absorbing outside case 32 is surrounded by both the semicircular arc bodies 54*a* and 54*b* in the sound absorbing side as well as the outer peripheral side of the filter outside case 21 is surrounded by both the semicircular are bodies 53*a* and 53*b* in the filter outlet side, and the filter outlet side junction flange 40 and the sound absorbing side junction flange 41 which pinch the gasket 24 are pinched from both sides in the exhaust gas moving direction by these semicircular arc bodies group (the outlet pinching flanges 53 and 54). Next, the bolts 42 are inserted into the bolt holes 58 of the bolt fastening portions 57 in the outlet pinching flanges 53 and 54 in both sides, and both the junction flanges 40 and 41, and are fastened by the nuts 43. As a result, both the junction flanges 40 and 41 are pinched and fixed by both the outlet pinching flanges 53 and 54, and the connection between the filter outside case 21 and the sound absorbing outside case 32 is finished. The confronting portions between the end portions of the semicircular arc bodies 53*a* and 53*b* in the filter outlet side and the semicircular arc bodies 54*a* and 54*b* in the sound absorbing side are structured such as to be positioned so as to be shifted at a phase of 72° from each other.

As shown in FIGS. 1 to 4 and 6, there are provided the gas purification bodies 2 and 3 which purify the exhaust gas discharged by the engine 70, the inside cases 4, 20, and 31 which embed the gas purification bodies 2 and 3, and the outside cases 5, 21, and 32 which embed the inside cases 4, 20, and 31. The inside cases 4, 20, and 31 are connected to the outside cases 5, 21, and 32 via the junction flanges 25, 26, 40, and 41 which protrude out to the outer peripheral sides of the outside cases 5, 21, and 32. A plurality of outside cases 5, 21, and 32 are connected by being provided with plural sets of the gas purification bodies 2 and 3, the inside cases 4, 20, and 31 and the outside cases 5, 21, and 32, and pinching and fixing the junction flanges 25 and 26 (40 and 41) by a pair of pinching flanges 51 and 52 (53 and 54).

According to the structure mentioned above, the adjacent junction flanges 25 and 26 (40 and 41) can be pinched from both sides by the pinching flanges 51 and 52 (53 and 54) so as to be pressure contacted (closely attached). Further, since the pinching flanges 51 to 54 are structured as the independent bodies without being welded to the outside cases 5, 21, and 32, there is no risk of generation of such problems as stress concentration and strain caused by the welding, in the relation between the pinching flanges 51 to 54 and the outside cases 5, 21, and 32. As a result, it is possible to apply an approximately uniform pressure contact force to a whole of the junction flanges 25 and 26 (40 and 41), and it is possible to maintain the surface pressure of the seal surfaces (the pinching surfaces) of the pinching flanges 51 to 54. As a result, it is possible to securely prevent the exhaust gas leakage from the portion between the junction flanges 25 and 26 (40 and 41).

As shown in FIGS. 1 to 4 and 6, the pinching flanges 51 to 54 are constructed by the semicircular are bodies 51*a* and 51*b* (52*a*, 52*b*, 53*a*, 53*b*, 54*a*, and 54*b*) which are divided into a plurality of sections in the peripheral direction of the outside cases 5, 21, and 32 and are formed into the horseshoe shape, and are structured such as to surround the outer peripheral sides of the outside cases 5, 21, and 32 by a plurality of semicircular are bodies 51*a* and 51*b* (52*a*, 52*b*, 53*a*, 53*b*, 54*a*, and 54*b*). Therefore, the same assembled state as the integral material can be achieved in spite of the pinching flanges 51 to 54 which are constructed by a plurality of semicircular arc bodies 51*a* and 51*b* (52*a*, 52*b*, 53*a*, 53*b*, 54*a*, and 54*b*). As a result, it is easy to assemble the pinching flanges 51 to 54 in comparison with the ring-shaped flange, and it is possible to improve an assembling workability. Further, it is possible to construct the DPF 1 having a high sealing performance while suppressing a processing cost and an assembling cost.

(6) Detailed Structure of Junction Flange

Figure 7:
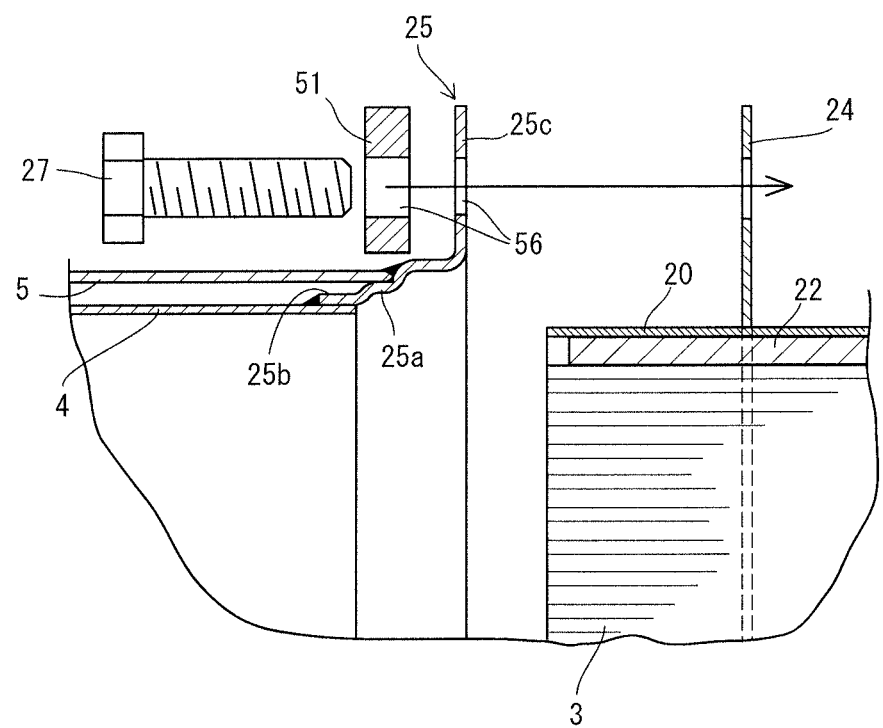
FIG. 7 is an enlarged cross sectional side elevational view of a catalyst side junction flange.

Next, a description will be given of a detailed structure of each of the junction flanges 25, 26, and 40. Since the junction flanges 25, 26, and 40 are structured in the same manner basically, a description will be given of the catalyst side junction flange 25 which is fixed by welding to the catalyst inside case 4 and the catalyst outside case 5 as a representative example with reference to FIG. 7. As shown in FIG. 7, the stepped stage portion 25*a* is formed in the folded corner portion of the catalyst side junction flange 25. The end portion in the exhaust gas downstream side of the catalyst outside case 5 is fitted to the stage portion 25a and the stage portion 25a is fixed by welding to the end portion in the exhaust gas downstream side of the catalyst outside case 5.

Meanwhile, an L-shaped inner diameter side end surface 25b in the catalyst side junction flange 25 is extended in the exhaust gas moving direction of the catalyst inside case 4 (the catalyst outside case 5). The inner diameter side end surface 25b is fitted to the end portion in the exhaust gas downstream side of the catalyst inside case 4, and the inner diameter side end surface 25b is fixed by welding to the catalyst inside case 4. Meanwhile, an L-shaped outer diameter side end surface 25c of the catalyst side junction flange 25 is extended from the outer periphery of the catalyst outside case 5 toward the radial direction (the vertical direction). A high rigidity of the catalyst side junction flange 25 is secured by the L-shaped cross sectional shape of the catalyst side junction flange 25 and the existence of the stage portion 25a.

The structure for pinching the outer diameter side end surface 25c of the catalyst side junction flange 25 by the pinching flanges 51 and 52 is achieved by threadably attaching the nuts 28 to the bolts 27 which pass through the bolt holes 56 of the pinching flanges 51 and 52 and the junction flanges 25 and 26 so as to fasten the pinching flanges 51 and 52 and the junction flanges 25 and 26, as mentioned above.

(6) Attaching Structure of Gas Temperature Sensor

Next, a description will be given of gas temperature sensors 109 and 112 which are provided in the DPF 1, with reference to FIGS. 1, 8, and 9. As shown in FIGS. 1, 8, and 9, one end side of a cylindrical sensor boss body 110 is fixed by welding to a portion between the upstream side tube portion 4a and the downstream side tube portion 4b in the outer peripheral surface of the catalyst inside case 4. The other end side of the sensor boss body 110 is extended in a radial direction from a sensor attaching opening 5a of the catalyst outside case 5 toward an outer side of the catalyst outside case 5. In other words, the sensor boss body 110 for supporting the exhaust gas sensor is provided in the vicinity of a connection boundary position (a catalyst downstream side space 29) between the diesel oxidation catalyst 2 and the soot filter 3 in the outer peripheral surface of the catalyst inside case 4 so as to pass through the catalyst outside case 5. A sensor attaching bolt 111 is threadably attached to the other end side of the sensor boss body 110. The upstream side gas temperature sensor 109, for example, of a thermistor type is passed through the sensor attaching bolt 111, and the upstream side gas temperature sensor 109 is supported to the sensor boss body 110 via the sensor attaching bolt 111. A detection portion of the upstream side gas temperature sensor 109 is protrudes into the catalyst downstream side space 29. In the structure mentioned above, in the case that the exhaust gas is discharged out of the gas outflow side end surface 2b of the diesel oxidation catalyst 2, the temperature of the exhaust gas is detected by the upstream side gas temperature sensor 109.

As shown in FIGS. 8 and 9, the sensor boss body 110 in the exhaust gas upstream side is positioned on extension of the gas outflow side end surface 2b which is perpendicular to the exhaust gas moving direction in the diesel oxidation catalyst 2 and on extension of the intake side end surface 3a which is perpendicular to the exhaust gas moving direction in the soot filter 3. In this case, since it is possible to set an arrangement distance between the gas outflow side end surface 2b of the diesel oxidation catalyst 2 and the intake side end surface 3a of the soot filter 3, and the upstream side gas temperature sensor 109 extremely short (closer), it is possible to achieve a compact structure of a whole of the DPF 1, and it is possible to improve detection precision of the upstream side gas temperature sensor 109, thereby contributing to performance improvement such as regeneration control in relation to the DPF 1.

As shown in FIGS. 1 and 5, one end side of the cylindrical sensor boss body 110 is fixed by welding to the vicinity of the filter downstream side space 49 in the outer peripheral surface of the filter inside case 20. The other end side of the sensor boss body 110 is extended in the radial direction from the sensor attaching opening 21a of the filter outside case 21 toward the outer side of the filter outside case 21. In other words, the sensor boss body 110 for supporting the exhaust gas sensor is provided in the vicinity of the connection boundary position of the soot filter 3 in the outer peripheral surface of the filter inside case 20 so as to pass through the filter outside case 21. The sensor attaching bolt 111 is threadably attached to the other end side of the sensor boss body 110. The downstream side gas temperature sensor 112, for example, of a thermistor type is passed through the sensor attaching bolt 111, and the downstream side gas temperature sensor 112 is supported to the sensor boss body 110 via the sensor attaching bolt 111. The detection portion of the downstream side gas temperature sensor 112 is protruded into the filter downstream side space 49. In the structure mentioned above, in the case that the exhaust gas is discharged out of the discharge side end surface 3b of the soot filter 3, the temperature of the exhaust gas is detected by the downstream side gas temperature sensor 112. Although details are not illustrated, it goes without saying that the sensor boss body of the differential pressure sensor can be structured in the same manner as the sensor boss body 110 in relation to both the gas temperature sensors 109 and 112.

(7) Summary

As is apparent from the description mentioned above and FIGS. 1, 5, and 9, in the exhaust gas purification device 1 having the gas purification body 2 which purifies the exhaust gas discharged from the engine 70, the purification casing 60 which accommodates the gas purification body 2, the exhaust gas inlet pipe 16 which communicates with the exhaust gas inflow port 12 of the purification casing 60, and the exhaust gas outlet pipe 34 which communicates with the exhaust gas outflow port of the purification casing 60, and structured such that the exhaust gas inlet pipe 16 is attached to the purification casing 60 in such a manner as to cover the exhaust gas inflow port 12 and extend in the longitudinal direction of the purification casing 60, and that the introduction passage 200 of the exhaust gas is formed by the outside surface of the purification casing 60 and the inside surface of the pipe wall 201 of the exhaust gas inlet pipe 16, the portion 202 extending along the purification casing 60 in the pipe wall 201 of the exhaust gas inlet pipe 16 is inclined so as to come close to the outside surface of the purification casing 60 gradually toward the exhaust gas outlet side 16b from the exhaust gas inlet side 16a of the exhaust gas inlet pipe 16. As a result, it is possible to heat up the purification casing 60 by the exhaust gas within the exhaust gas inlet pipe 16 (within the introduction passage 200), and it is possible to suppress the reduction of the temperature of the exhaust gas which passes through the inner side of the purification casing 60. Therefore, it is possible to improve the exhaust gas purification performance of the exhaust gas purification device 1. The inclined shape of the portion 202 extending along the purification casing 60 in the pipe wall 201 is formed into a guide surface which feeds the exhaust gas to the exhaust gas inflow port 12. The exhaust gas inlet pipe 16 can be utilized as a reinforcing member of the purification casing 60, and it is possible to smoothly guide the exhaust gas from the engine 70 into the purification casing 60 by the inclined shape of the portion 202 extending along the purification casing 60 in the pipe wall 201 in spite of the fact that a rigidity improvement of the purification casing 60 can be achieved by a simple structure without thickening the purification casing 60 or extremely increasing the parts number. The exhaust gas can be supplied to a wide area of the gas purification body 2 within the purification casing 60, thereby contributing to efficient utilization of the gas purification body 2.

As is apparent from the description mentioned above and FIGS. 1, 5, and 9, the concave surface portion 204 concaved outward is formed in the inner surface side of the side end surface 8 close to the exhaust gas inflow port 12 in the purification casing 60. As a result, the exhaust gas can be supplied from the exhaust gas inflow port 12 of the purification casing 60 toward the concave surface portion 204, and a swirl flow and a turbulent flow can be easily formed in the exhaust gas upstream side of the gas purification body 2 on the basis of an exhaust gas diffusing action generated by the concave surface portion 204. Therefore, it is possible to supply the exhaust gas to an end surface 2a in the exhaust gas upstream side of the gas purification body 2 as uniformly as possible.

As is apparent from the description mentioned above and FIGS. 1, 5, and 9, the portion 203 close to the exhaust gas outflow port 34 in the pipe wall 201 of the exhaust gas inlet pipe 16 is inclined so as to move away from the center line C of the exhaust gas inlet side 16a gradually toward the exhaust gas outlet side 16b from the exhaust gas inlet side 16a of the exhaust gas inlet pipe 16. As a result, the exhaust gas comes into collision with the outside surface of the purification casing 60 in the portion 203 close to the exhaust gas outflow port 34 in the inside surface of the pipe wall 201 of the exhaust gas inlet pipe 16, however, a cubic capacity of the portion 203 is secured. Therefore, the formation of the swirl flow and the turbulent flow can be carried out even in the side closer to the exhaust gas upstream than the exhaust gas inflow port 12. The exhaust gas can be uniformly supplied to the end surface 2a in the exhaust gas upstream side of the gas purification body 2 more securely.

The structure of each of the portions in the present invention is not limited to the illustrated embodiment, but can be variously modified within a range which does not deflect from the scope of the present invention.

REFERENCE SIGNS LIST

1 DPF (diesel particulate filter)
2 Diesel oxidation catalyst (gas purification body)
3 Soot filter (gas purification body)
4 Catalyst inside case
5 Catalyst outside case
20 Filter inside case
21 Filter outside case
25, 26, 40, 41 Junction flange (flange body)
30 Silencer
31 Sound absorbing inside case
32 Sound absorbing outside case
38 Exhaust gas introduction pipe
60 DPF casing
70 Diesel engine
200 Introduction passage
201 Pipe wall
202 Longitudinally inclined portion
203 Short-direction inclined portion
204 Concave surface portion

The invention claimed is:

1. An exhaust gas purification device comprising:
a gas purification body which purifies exhaust gas discharged from an engine;
a purification casing which accommodates the gas purification body;
an exhaust gas inlet pipe which communicates with an exhaust gas inflow port of the purification casing;
an exhaust gas outlet pipe which communicates with an exhaust gas outflow port of the purification casing;
the exhaust gas inlet pipe being attached to the purification casing in such a manner as to cover the exhaust gas inflow port and extend in a longitudinal direction of the purification casing; and
an introduction passage of the exhaust gas being formed by an outside surface of the purification casing and an inside surface of a pipe wall of the exhaust gas inlet pipe,
wherein a first portion of the pipe wall of the exhaust gas inlet pipe extends along the purification casing and is inclined to form a longitudinal inclined portion that gradually approaches the outside surface of the purification casing as it goes from the exhaust gas inlet side towards the exhaust gas outlet side of the exhaust gas inlet pipe, so as to direct the flow of the exhaust has flowing into the exhaust gas inlet pipe toward a direction of the exhaust gas inflow port,
a second portion of the pipe wall of the exhaust gas inlet pipe close to the exhaust gas outflow port is inclined to form a short-side inclined portion that gradually moves away from a center line of the exhaust gas inlet side as the exhaust gas inlet pipe goes from the exhaust gas inlet side toward the exhaust gas outlet side of the exhaust gas inlet pipe, and wherein
an outwardly concave surface portion is formed in an inner surface side of a side end surface close to the exhaust gas inflow port in the purification casing.

2. The exhaust gas purification device according to claim 1, wherein an inner lid body is provided in the side end portion close to the exhaust gas inflow port of the purification casing, and a concave surface portion is formed in the inner surface side of the inner lid body.

3. The exhaust gas purification device according to claim 1, wherein the first portion of the pipe wall of the exhaust gas inlet pipe continuously approaches a plane defined by the outside surface of the purification casing, from an exhaust gas inlet side to an exhaust gas outlet side of the exhaust gas inlet pipe.

4. The exhaust gas purification device according to claim 1, wherein the concave surface portion is operably connected to the exhaust gas inflow port so that exhaust gas can flow from the exhaust gas inflow port to the concave surface portion.

* * * * *